United States Patent [19]

Kinsner et al.

[11] 3,909,809

[45] Sept. 30, 1975

[54] MAGNETIC BUBBLE DOMAIN SENSING DEVICE

[75] Inventors: Witold Kinsner, Hamilton; Edward Della Torre, Toronto, both of Canada

[73] Assignee: Canadian Patents and Development Limited, Ottawa, Canada

[22] Filed: Dec. 17, 1973

[21] Appl. No.: 425,696

[52] U.S. Cl. .................... 340/174 TF; 340/174 MS

[51] Int. Cl.² .......................................... G11C 11/14

[58] Field of Search ................ 340/174 TF, 174 MS

[56] References Cited

UNITED STATES PATENTS

| | | | |
|---|---|---|---|
| 3,735,369 | 5/1973 | Iida | 340/174 MS |
| 3,825,910 | 7/1974 | Carr, Jr. et al. | 340/174 TF |

OTHER PUBLICATIONS

Electronics–"Components That Learn and How To Use Them" by H. S. Crafts; Mar. 22, 1963, pp. 49 to 53.

*Primary Examiner*—James W. Moffitt
*Attorney, Agent, or Firm*—Edward Rymek

[57] ABSTRACT

The sensing of magnetic bubble-domains is presently carried out using one of four techniques: inductive, magnetooptic, galvanomagnetic and magnetoresistive sensing. These techniques have a number of drawbacks such as size, complexity or inadequate sensitivity. The present invention provides for the sensing of bubble domains by first converting the energy associated with the bubble magnetic field to mechanical energy, and secondly by converting the mechanical energy to electrical energy which provides an electrical signal indicating the presence of a bubble domain. This method is carried out in a sensing device having a layer of magnetostrictive material in which the magnetic field produces an elastic strain and a layer of piezoelectric material which is fixed to the magnetostrictive material and converts the mechanical energy to electrical energy.

11 Claims, 6 Drawing Figures

MAGNETIC BUBBLE DOMAIN SENSING DEVICE

This invention relates to magnetic bubble-domain sensing devices and, in particular, to a novel method and device for combined magnetostrictive-piezoelectric sensing of magnetic domains propagated in a sheet of magnetic bubble-domain supporting material.

Presently, four types of bubble-domain detection techniques exist: inductive, magnetooptic, galvanomagnetic, and magnetoresistive.

The detection of bubble-domains was first done inductively with a pickup loop (bubble diameter $\sim 100\mu m$). Methods of inductively sensing the signal from a propagating bubble are limited to the order to $100\mu V$ per output channel per turn of a pickup loop. They produce a transient output signal, i.e., the signal depends on the velocity of the bubble. In addition, the signal decreases with decreasing of the diameter of the bubble because of the small amount of available flux.

Magnetooptic detection appears to have potential but because of the sophisticated packaging requirements of such a system, difficulties arise in its practical implementation.

Hall-effect sensors furnish up to a 2 mV signal for a 300mV input and a 130 $\mu m$ bubble. Bubbles as small as 10 $\mu m$ have been detected with smaller efficiency. However, the manufacture process of these detectors is difficult; they have four terminals, require high power, and have poor temperature stability of their resistance.

Magnetic film magnetoresistive devices can produce signals of several millivolts from a single output channel. Their physical properties are better than those of the Hall-effect detectors, and they are used in most of the practical bubble devices.

The galvanomagnetic and magnetoresistive detectors require an external power supply. Therefore, their signal to noise ratio is affected by the existing current.

It is therefore an object of this invention to provide a novel method of detecting magnetic-bubble domains.

It is a further object of this invention to provide a self-contained sensing device which does not require an external power source.

It is another object of this invention to provide a sensing device without the noise usually caused by the activating current necessary in other sensing devices (magnetoresistive or Hall-effect devices.)

It is another object of this invention to provide a sensing device which virtually insensitive to transverse fields propagating bubbles.

It is another object of this invention to provide a sensing device which is sensitive to magnetic bubble-domains having very small diameters.

It is a further object of this invention to provide a sensing device which provides an effective output at any domain velocity.

These and other objects are generally achieved by converting the magnetic field energy associated with a bubble domain to a mechanical energy in a magnetostrictive material. The mechanical energy is then converted to electrical energy in a piezoelectric device. The electrical energy providing an output signal of the sensed bubble-domain.

The magnetic bubble-domain sensing device basically includes a layer of magnetostrictive material which possesses a high magnetostrictive constant. This layer is rigidly fixed to a layer of piezoelectric material such that any elastic strain produced by the bubble-domain magnetic-field in the magnetostrictive material is transmitted to the piezoelectric material which generates an electrical signal. Two electrodes are located on the magnetostrictive-piezoelectric (MP) detector which may be connected to a utilization circuit. In the drawings.

The method of sensing magnetic bubble-domain in accordance with this invention is based on two phenomena: magnetostriction, the property of certain materials which undergo a change in dimensions in a magnetic field, and piezoelectricity, the property of certain dielectric crystals wherein a difference of electric potential is developed across them as a result of applied mechanical stresses.

Figure 1:
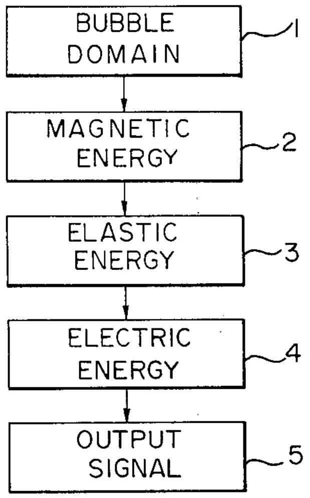
FIG. 1 is a schematic diagram of the energy conversions involved in the method.

The method is schematically shown in FIG. 1. Block 1 represents the magnetic bubble-domain which exists in a bubble supporting material. Block 2 represents energy of the magnetic field associated with the bubble-domain. The magnetic energy is converted to elastic or mechanical energy, by means of a magnetostrictive material which is coupled to the magnetic field. The mechanical energy is represented by block 3. The elastic energy is then in turn converted to electrical energy by means of a piezoelectric material. The electrical energy is represented by block 4. Finally an electrical output signal 5 which represents the presence of a bubble domain is taken from across the piezoelectric material.

This bubble-domain sensing method involves a double energy conversion which does not depend on the bubble velocity. In addition, it provides a relatively high output signal with a minimum of noise since there is no current provided from an external source.

Figure 2:
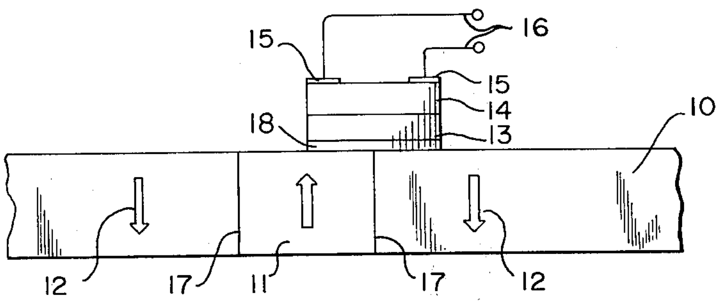
FIG. 2 is a side view of one embodiment of the magnetostrictive-piezoelectric (MP) detector on a magnetic bubble-domain supporting material.
Figure 3:
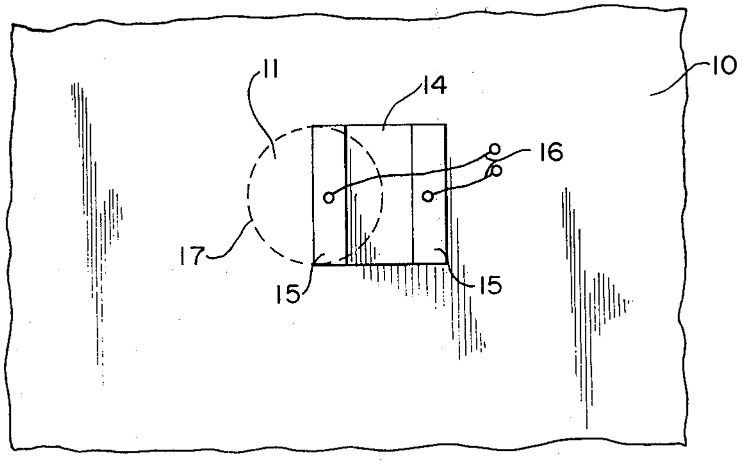
FIG. 3 is a top view of the MP detector illustrated in FIG. 2.

FIGS. 2 and 3 illustrate structure of one embodiment of the MP detector in accordance with the invention, on a bubble-domain supporting material 10. The bubble material which may be an orthoferrite, garnet or cobalt, is magnetized in a single direction as indicated by arrows 12. The magnetization of a bubble 11 which is usually cylindrical with a distinct wall 17, is antiparallel to the magnetization of the surrounding material.

The MP detector shown in FIGS. 2 and 3 includes a layer of magnetostrictive material 13 on the bubble material 10. Layer 13 may be deposited directly in material 10 or on a thin glass substrate 18 which has been deposited on the bubble material 10, as shown. A layer of piezoelectric material 14 is placed or deposited on layer 13 such that it is mechanically coupled to layer 13. The detector further includes two contacts 15 with corresponding conductors or leads 16 which are spaced one from the other and across which the piezoelectric material generators a voltage.

For proper operation, the magnetostrictive material should possess a high magnetostrictive constant (high sensitivity), the magnetostriction of the material should approach saturation for small values of the magnetic field, to match the bubble closure field. In addition, the material should not affect the propagation of bubbles, and the deposition procedure of this material should be easy. Magnetostrictive nickel-iron alloys satisfy these requirements. The highest positive magnetostriction of Ni-Fe alloys occurs in the range of 45 to 68% Ni in Fe. The deposition process of such alloys is the same as for the nonmagnetostrictive Permalloy (~80% Ni) as used for the bubble propagate circuits. The saturation magnetostriction of such alloys occurs at 5 to 25 Oersteds of the magnetic field strength $H_b$, which is below the maximum field produced by a bubble. The material may be isotropic or it may have some induced anisotropy in order to increase the coupling between the bubble field and the magnetostrictive material.

A variety of piezoelectric materials may be used in the MP detector. For instance, piezoelectric ceramics or semi-conductors have ideal properties with this regard. A thin-film of fine-grain barium titanate, $BaTiO_3$, can be readily deposited by different techniques. Another ferroelectric material such as lead-ziconate-titanate, PZT, has substantially higher electro mechanical coupling coefficients, and its piezoelectric properties are less temperature sensitive. Recently, a series of new piezoelectric ceramics has been developed which supersede the PZT ceramics. The ceramics are binary solid solutions of $PbTiO_3$—$PbZrO_3$, which additives, ternary solutions of $Pb(Me^{I}Me^{II})O_3$—$PbTiO_3$—$PbZrO_3$, and quaternary solutions of $(NaBi)TiO_3$—$(NaBi)ZrO_3PbTiO_3$—$PbZrO_3$. A particular composition $Pb(Mn_{1/3}Sb_{2/3})O_3$—$PbTiO_3$—$PbZrO_3$ has excellent characteristics both in piezoelectric properties and stability. The deposition of thin films of these ceramics appears to be well known.

Cadmium sulphide, CdS, or zinc oxide, ZnO, may also be used as the piezoelectric materials. Their electromechanical coupling coefficients are lower than those of PZT ceramics, however, the deposition process is easier. In addition, an induced orientation can be achieved during the deposition.

In operation, the magnetic field of the bubble produces an elastic strain which is coupled with the piezoelectric material. The piezoelectric material subjected to strain produces the desired electric signal indicating the presence of a bubble under the sensor. The distribution of the bubble closure magnetic field shows that a bubble located approximately two bubble diameters from the detector will not produce the desired level of the output signal. This assures detection at the highest bubble density in the bubble material. The sandwiched structure shown in FIGS. 2 and 3 is chosen in order to obtain the highest possible energy conversion.

The output contacts 15 may be made of gold — Au, silver — Ag, aluminum — Al or copper — Cu in any conventional manner.

It has been determined that, with films prepared from a 60% Ni-40% Fe melt which have a magnetostrictive coefficient $\eta = 9.5 \times 10^4$, the bubble field H = 20 Oe produces an effective strain of $\epsilon = 9 \times 10^{116\ 8}$ cm/cm. Additionally, the sensitivity of a 7 mil thick PZT-4 transducer is $7.6 \times 10^{-7}$ cm/cm/V where V is the voltage at the electrodes when the bound loss is negligible. Therefore, output voltage of ~ 100 mV is produced across the electrodes when a bubble is present under the MP detector.

Though FIGS. 2 and 3 illustrate one embodiment of the MP detector, various configurations for the detector may be effectively used. The surface of the layers need not be square, as shown, but may be circular, a strip or any other shape, but should be approximately the same size, at least in one dimension, as the bubble-domain.

Further, contacts 15 need not be both located on the piezoelectric material. One of the contacts may be located on the Ni-Fe alloy magnetostrictive material. In this case, however, the permalloy resistivity can be controlled by molybdenum in order to match the output requirements.

Further the piezoelectric material may be etched to the same geometry as the permalloy material in order to eliminate processing steps. That is, the piezoelectric material will not interfere with the device operation if it is applied everywhere where there is permalloy. Thus, the only additional processing step in the manufacture of this detector is the evaporation of the piezoelectric material.

Finally, in some applications, the additional magnetostrictive layer 13 can be eliminated. If the bubble material itself is magnetostrictive, the piezoelectric layer 14 may be placed directly on the bubble material. Common bubble materials are magnetostrictive, but their magnetostrictive constants are very small compared to the materials 13 described above.

Figure 4:
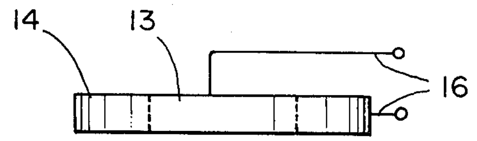
FIG. 4 is a side view of a second embodiment of the MP detector.
Figure 5:
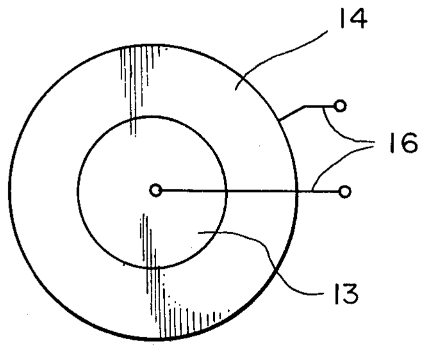
FIG. 5 is a top view of the MP detector illustrated in FIG. 4.
Figure 6:
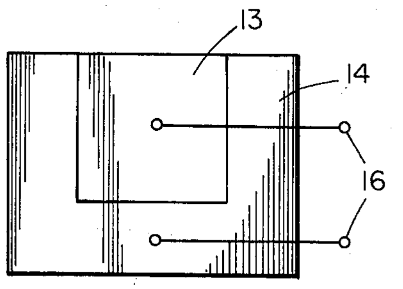
FIG. 6 is a top view of a second embodiment of the MP detector illustrated in FIG. 4.

FIGS. 4, 5 and 6 illustrate another embodiment of the invention wherein the piezoelectric material 14 is in the same plane as the magnetostrictive material 13. The magnetostrictive material 13 may have a circular shape as shown on FIG. 5, or it may have any other configuration such as square as shown in FIG. 6. The piezoelectric material 14 is mechanically fixed to the sides of the magnetostrictive material 13 and may surround it totally, as shown on FIG. 5, or only partially as shown in FIG. 6. Once again, leads 16 may be fixed in a spaced manner to the piezoelectric materials 14 or one of the leads 16 may be fixed to the magnetostrictive material as shown.

We claim:

1. A method of sensing magnetic bubble-domains in bubble supporting material comprising:

converting the magnetic energy in a magnetic field caused by the presence of a bubble domain in a bubble-supporting material, to mechanical energy;

converting said mechanical energy to electrical energy; and detecting said electrical energy to provide an indication of the presence of said bubble-domain.

2. A device for sensing magnetic bubble-domains in bubble supporting material comprising:

first means for converting the magnetic energy in a magnetic field caused by the presence of a bubble-domain in said bubble supporting material, to mechanical energy;

second means coupled to said first means for converting said mechanical energy to electrical energy; and third means for receiving said electrical energy to indicate the presence of said bubble-domain.

3. A device as claimed in claim 2 wherein:

the first means consists of a thin layer of magnetostrictive material having predetermined configuration, fixed to said supporting material; and the second means consists of a thin layer of piezoelectric material fixed to and at least partially surrounding the magnetostrictive material.

4. A device as claimed in claim 2 wherein said first means consists of a thin glass substrate fixed to said supporting material; and a thin layer of magnetostrictive material fixed to said glass substrate.

5. A device as claimed in claim 2 wherein:

said bubble-domain supporting material consists of magnetostrictive material to form said first means for converting the magnetic energy to mechanical energy; and said second means consists of a thin layer of piezoelectric material fixed to said bubble supporting material.

6. A device as claimed in claim 2 wherein:

said first means includes a magnetostrictive material; and said second means includes a piezoelectric material.

7. A device as claimed in claim 6 wherein:

said magnetostrictive material is a Ni-Fe alloy having 45 to 68% Ni in Fe.

8. A device as claimed in claim 6 wherein the piezoelectric material is one of the group consisting of $BaTiO_3$, PZT ceramic, $PbTiO_3$—$PbZkO_3$, $Pb(Me'Me'')O_3-PbTiO_3-PbZrO_3$, $Pb(M_{r1/3}Sb_{2/3})$-$O_3-PbTiO_3$-$PbZrO_3(NaBi)TiO_3-(NaBi)ZrO_3$ $PbTiO_3-PbZrO_3$, CdS or ZnO.

9. A device as claimed in claim 2 wherein:

the first means consists of a thin layer of magnetostrictive material fixed to said supporting material; and the second means consists of a thin layer of piezoelectric material fixed to said magnetostrictive material.

10. A device as claimed in claim 9 wherein said third means includes first and second spaced electrical contacts;

said contacts being fixed to the piezoelectric material.

11. A device as claimed in claim 9 wherein said third means includes first and second electrical contacts:

said first contact being fixed to the piezoelectric material and said second contact being fixed to the magnetostrictive material.

* * * * *